United States Patent
Friedman et al.

(10) Patent No.: US 9,438,479 B1
(45) Date of Patent: *Sep. 6, 2016

(54) DISTRIBUTED SUBNET MANAGER FOR INFINIBAND NETWORKS

(71) Applicant: International Business Machines Corporation, Armonk, NY (US)

(72) Inventors: Alex Friedman, Hadera (IL); Constantine Gavrilov, Rishon-Le-Zion (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/078,018

(22) Filed: Mar. 23, 2016

Related U.S. Application Data

(63) Continuation of application No. 14/862,235, filed on Sep. 23, 2015.

(51) Int. Cl.
*H04L 12/24* (2006.01)
*H04L 12/741* (2013.01)

(52) U.S. Cl.
CPC ............... *H04L 41/12* (2013.01); *H04L 45/54* (2013.01)

(58) Field of Classification Search
CPC . G06F 3/067; G06F 13/4022; H04L 41/044; H04L 41/046; H04L 41/12; H04L 63/0442; H04L 45/00
See application file for complete search history.

(56) References Cited

U.S. PATENT DOCUMENTS

| | | | |
|---|---|---|---|
| 7,010,607 B1 | 3/2006 | Bunton | |
| 7,421,488 B2 * | 9/2008 | Elko | H04L 41/044 709/223 |
| 7,653,769 B2 | 1/2010 | Fisher et al. | |
| 7,843,962 B2 * | 11/2010 | Gunthorpe | H04L 12/4633 370/466 |
| 8,429,630 B2 * | 4/2013 | Nickolov | G06F 9/4856 717/110 |
| 8,578,076 B2 * | 11/2013 | van der Linden | G06F 9/5077 709/227 |
| 9,210,100 B2 * | 12/2015 | Van Der Linden | G06F 9/5077 |
| 9,219,718 B2 * | 12/2015 | Johnsen | H04L 9/3234 |
| 2003/0005039 A1 | 1/2003 | Craddock et al. | |
| 2004/0054828 A1 | 3/2004 | Finch | |
| 2004/0190546 A1 | 9/2004 | Jackson | |
| 2005/0038883 A1 | 2/2005 | Elko et al. | |

(Continued)

OTHER PUBLICATIONS

Vishnu, et al.;"Performance Modeling of Subnet Management on Fat Tree InfiniBand Networks using OpenSM"; Proceedings of the 19th IEEE International Parallel and Distributed Processing Symposium (IPDPS'05); 2005; pp. 1-8; IEEE Computer Society.
IBM; "Driving performance with the IBM XIV Storage System"; IBM Systems and Technology; White Paper; Copyright IBM Corporation 2013; Apr. 2013; pp. 1-15.

(Continued)

*Primary Examiner* — Backhean Tiv
(74) *Attorney, Agent, or Firm* — Olivia R. Scheuer

(57) ABSTRACT

In an approach for distributed management of a network, a processor discovers a network, wherein the network is comprised of a plurality of nodes and an at least one switch. A processor identifies a first port associated with the at least one node. A processor identifies a link between the first port and a second port within the network. A processor determines the at least one link is properly configured. A processor selects a first node of the plurality of nodes to be a master node, wherein the master node is configured to manage the network. A processor initializes a routing table, wherein the routing table contains locations of each node in the plurality of nodes and a location of the at least one switch. A processor adjusts by the first node, the routing table based on the change to the network.

1 Claim, 8 Drawing Sheets

(56) References Cited

U.S. PATENT DOCUMENTS

| | | |
|---|---|---|
| 2008/0144531 A1 | 6/2008 | Fisher et al. |
| 2008/0201403 A1 | 8/2008 | Andersson et al. |
| 2009/0276771 A1* | 11/2009 | Nickolov ............... G06F 9/4856 717/177 |
| 2010/0274943 A1 | 10/2010 | Mahadevan et al. |
| 2011/0022812 A1* | 1/2011 | van der Linden .... G06F 9/5077 711/163 |
| 2011/0274010 A1 | 11/2011 | Kwon et al. |
| 2012/0079090 A1* | 3/2012 | Johnsen ................ H04L 12/462 709/223 |
| 2013/0051222 A1* | 2/2013 | Gavrilov ............. H04L 41/0668 370/225 |
| 2013/0054947 A1* | 2/2013 | Gavrilov ............... G06F 9/4401 713/2 |
| 2013/0262937 A1* | 10/2013 | Sridharan ........... G06F 11/0709 714/47.2 |
| 2013/0301646 A1* | 11/2013 | Bogdanski ........... H04L 49/253 370/401 |
| 2014/0040343 A1* | 2/2014 | Nickolov .............. G06F 9/4856 709/201 |
| 2014/0052864 A1* | 2/2014 | Van Der Linden ... G06F 9/5077 709/226 |
| 2014/0105029 A1 | 4/2014 | Jain et al. |
| 2014/0269720 A1* | 9/2014 | Srinivasan ............. H04L 49/25 370/392 |
| 2014/0281462 A1 | 9/2014 | Friedman et al. |

OTHER PUBLICATIONS

IBM; "Low Cost Method for Implementing an InfiniBand Linear Forwarding Table"; IP.com; IP.com No. 000133316; Jan. 23, 2006; pp. 1-3.

Kashyap; "IP over InfiniBand (IPoIB) Architecture (RFC4392)"; IP.com; Original Publication Date: Apr. 1, 2006; IP.com No. 000135266; IP.com Electronic Publication date: Apr. 8, 2006. pp. 1-23; Copyright © The Internet Society (2006).

"A self-configuring network"; IP.com; IP.com No. 000007386; Mar. 20, 2002; 1 page.

"Method and System for Network Self Healing using Network Intelligence"; IP.com; IP.com No. 000219386; Jun. 27, 2012; pp. 1-11.

"Method for Topology Independent Path Determination in InfiniBand Subnets"; IP.com; IP.com No. 000012791; May 28, 2003; 6 pages.

Appendix P: List of IBM Patents or Patent Applications Treated as Related; Dated Apr. 26, 2016; 2 pages.

U.S. Appl. No. 14/862,235, filed Sep. 23, 2015; Entitled "Distributed Subnet Manager for Infiniband Networks".

U.S. Appl. No. 14/862,255, filed Sep. 23, 2015; Entitled "Election and Use of Configuration Manager".

U.S. Appl. No. 15/078,080, filed Mar. 23, 2016, Entitled "Election and Use of Configuration Manager".

U.S. Appl. No. 14/862,309, filed Sep. 23, 2015; Entitled "Cooperative Mkey Locking for Managing Infiniband Networks".

* cited by examiner

DISTRIBUTED SUBNET MANAGER FOR INFINIBAND NETWORKS

BACKGROUND

The present invention relates generally to the field of networks, and more particularly to managing a network routing table configuration.

InfiniBand® is an industry-standard specification that defines and input/output architecture used to interconnect servers, communications infrastructure equipment, storage and embedded systems. InfiniBand® is a registered trademark and service mark of the InfiniBand® Trade Association. InfiniBand® is a computer network communications connection used in high-performance computing featuring very high throughput and very low latency. InfiniBand® is used for data interconnect both among and within computers. InfiniBand® is a commonly used interconnect in supercomputers. InfiniBand® is a type of communications connection for data flow between processors and I/O devices that offers throughput of up to 56 gigabits per second and support for up to 64,000 addressable devices.

The internal data flow system in most personal computers (PCs) and server systems is inflexible and relatively slow. As the amount of data coming into and flowing between components in the computer increases, the existing bus system becomes a bottleneck. Instead of sending data in parallel (typically 32 bits at a time, but in some computers 64 bits) across the backplane bus, InfiniBand® specifies a serial (bit-at-a-time) bus. Fewer pins and other electrical connections are required, saving manufacturing cost and improving reliability. The serial bus can carry multiple channels of data at the same time in a multiplexing signal. InfiniBand® also supports multiple memory areas, each of which can be addressed by both processors and storage devices.

With InfiniBand®, data is transmitted in packets that together form a communication called a message. A message can be a remote direct memory access (RDMA) read or write operation, a channel send or receive message, a reversible transaction-based operation or a multicast transmission. Like the channel model many mainframe users are familiar with, transmission begins or ends with a channel adapter. Each processor (your PC or a data center server, for example) has what is called a host channel adapter (HCA) and each peripheral device has a target channel adapter (TCA). HCAs are I/O engines located within a server. TCAs enable remote storage and network connectivity into the InfiniBand® interconnect infrastructure, called a fabric.

InfiniBand® links have physical and logical state properties. The physical property of the link is negotiated in hardware. The logical state of the link is managed by software. When physical link goes up, the logical state of the link is not active. There is no address assigned to the port, and applications cannot communicate with the port using arbitrary data protocols. A possible communication is done by sending and receiving subnet management protocol (SMP) Unicast datagrams (UD), which are used to discover and configure the network. InfiniBand® networks require a subnet manager software entity running on one of the nodes.

The Subnet Manager uses SMP datagrams to discover and configure the network. The discovery is done via direct route (e.g., by specifying each hop of source-to-destination path) and does not require switch routing. The task of the Subnet Manager is to discover the fabric, assign LID addresses to each end-point, configure switch routing tables and put each end-point to logical Active state. The Subnet Manager is also responsible for removing the no longer present end-points from the routing tables, and answer subnet administration (SA) queries, which perform operations on its internal tables and do multicast management. Once the Subnet Manager brings the end-point to Active state, the end-point can exchange data with other end-points in the fabric in Active state.

The Subnet Manager standard is covered in InfiniBand® Architecture Specification. Existing standards assumes a single Subnet Manager in master role in the fabric. That assumption, nature of network environments, and certain requirements of SMP specifications, can cause significant latencies in bring-up of large, and even not so large, networks to ACTIVE state. The multi-hop discovery is subject to timeouts and retries. Many existing switches can queue a very small number of direct route packets (e.g., some have queue sizes of 1) and require a slow software path, which makes discovery serialized. The discovery of each end-point requires several SMP queries, PortInfo and NodeInfo at the minimum, which further slows the discovery. Setting up each end-point also requires multiple requests (e.g., several PortInfo requests and setting up VL arbitration tables and SL to VL mapping). The handling of most SMPs is implemented via hardware-software-hardware path on the end-points, which requires a software application on the end point that answers in time, which can be a challenge if the whole network cluster is booting and many software applications with direct access to hardware are initializing, causing resource contentions (locking, interrupt configuration, PCI configuration, and so on). Since the subnet manager specification wants to discover the whole fabric in order to build coherent routing tables, the subnet manager specification makes the best effort to wait for all end-points to answer it queries, which further increases the network configuration latency.

SUMMARY

Aspects of an embodiment of the present invention disclose a method, computer program product, and computer system for distributed management of a network. A process discovers a network, wherein the network is comprised of a plurality of nodes and an at least one switch. A processor identifies a first port associated with the at least one node. A processor identifies a link between the first port and a second port within the network. A processor determines the at least one link is properly configured. A processor selects a first node of the plurality of nodes to be a master node, wherein the master node is configured to manage the network. A processor initializes a routing table, wherein the routing table contains locations of each node in the plurality of nodes and a location of the at least one switch. A processor identifies by the first node, a change to the network. A processor adjusts by the first node, the routing table based on the change to the network.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module", or "system." Furthermore, aspects of the present invention may take the form of a computer program product embodied in one or more computer readable medium(s) having computer readable program code/instructions embodied thereon.

Embodiments of the present invention disclose an approach to manage/configure the nodes of the computer network.

Embodiments of the present invention disclose a method, computer program product, and computer system, to manage components of a computer network.

The present invention will now be described in detail with reference to the Figures.

Figure 1:
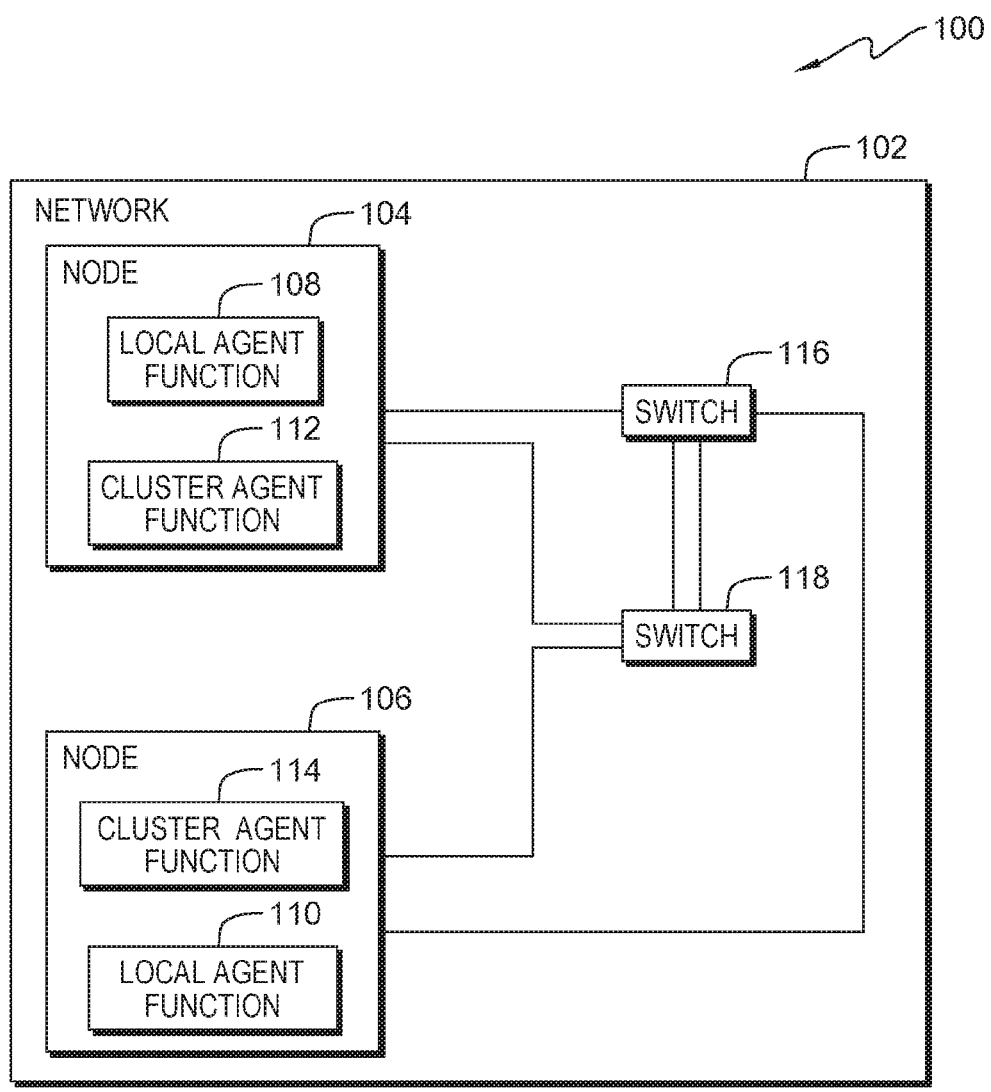
FIG. 1 depicts a block diagram depicting a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to, network 102, node 104 and node 106, switch 116 and switch 118. Computing environment 100 may include additional computing devices, servers, computers, switches, or other devices not shown.

Network 102 may be a local area network (LAN), a wide area network (WAN) such as the Internet, any combination thereof, or any combination of connections and protocols which support communications between node 104 and node 106, switch 116 and switch 118. Network 102 maybe a subnet, or other type of network which is embedded in a larger system. In one embodiment, network 102 is an InfiniBand® network. Network 102 may include wired, wireless, or fiber optic connections. Network 102 provides a network for nodes 104, node 106, switch 116, and switch 118 to communicate with one another without the significant overhead of an operating system. Additionally, network 102 allows nodes 104 and 106 to discover and configure the network fabric.

Node 104 and node 106 each can be a source or destination in a communication. Node 104 and node 106 are substantially similar to one another. A communication can be a message, data, or other information which is sent from one location (e.g., a source) to a next location (e.g., a destination) in computing environment 100. Nodes 104 and 106 may each be a desktop computer, laptop computer, tablet computer, netbook computer, personal computer (PC), a desktop computer, mobile device, or any programmable electronic device capable of communicating via network 102. Node 104 and node 106 may each be, for example, a host node, a destination node, a target node, an initiator node, or any other type of node within the network fabric. In one embodiment, nodes 104 and 106 may each be a storage initiator, a storage target, a database server, a database client, a management server, a web server, or other electronic device or computing system capable of processing program instructions and receiving and sending data. In another embodiment, nodes 104 and 106 may be any hardware component such as a processor, random access memory (RAM) or other hardware components which output data that is then sent to another hardware component.

Switch 116 and switch 118 are computer networking devices which connect devices together on network 102. In one embodiment, switch 116 and switch 118 are substantially similar to one another. Network 102 contains at least one switch. Switches 116 and switch 118 route messages or data from the source to the destination based on routing tables located on switch 116 or switch 118, which are populated with forwarding information during startup of network 102 or modifications to network 102, as described below. The routing tables may describe unicast or multicast rules. The routing tables may conform to InfiniBand® Linear Forwarding Table (LFT) or Multicast Forwarding Table (MFT) specifications. In another embodiment, the format, content, and organization of the routing tables in switches 116 and 118 is vendor specific. In another embodiment, switches 116 and 118 are multiport network bridges which use hardware addresses to process and forward data. In other embodiments, switch 116 and switch 118 can also process data at the network layer by additionally incorporating routing functionality. In one embodiment, the size and number of ports of switch 116 and switch 118 may vary. In another embodiment, switch 116 and switch 118 manages the flow of data across network 102 by exchanging a received message, which is received at node 104 and sent to node 106.

Local agent function 108 and local agent function 110 are, respectively, responsible for link configuration of ports which are local to node 104 and node 106. Local agent function 108 and local agent function 110 discover the local and remote ports of local links, assign addresses to local ports and configure routing entries for assigned addresses on switch 116 and switch 118. Local agent function 108 and local agent function 110 are substantially similar to one another. In the depicted embodiment local agent function 108 is located on node 104. In additional embodiments, local agent function 108 can be located on other nodes. In the depicted embodiment local agent function 110 is located on node 106. In additional embodiments, local agent function 110 can be located on other nodes.

Cluster agent function 112 and cluster agent function 114 manage cross-switch routing, the initial setup of switch 116 and switch 118, dead point elimination, resetting of non-responding components, configuration of end-points which do not have local agent functionality, and providing subnet administrator (SA) functionality. Since many setups require cross-switch routing periodically during failover because of failed links, the fabric latency discovery does not become a factor in network bring-up. Cluster agent function 112 and cluster agent function 114 are substantially similar to one another. In the depicted embodiment cluster agent function 112 is located on node 104. In additional embodiments, cluster agent function 112 can be located on other nodes. In the depicted embodiment cluster agent function 112 is located on node 106. In additional embodiments, cluster agent function 114 can be located on other nodes. Local agent function 108 and 110 together with cluster agent function 112 and 114 implement a distributed subnet manager.

Figure 2:
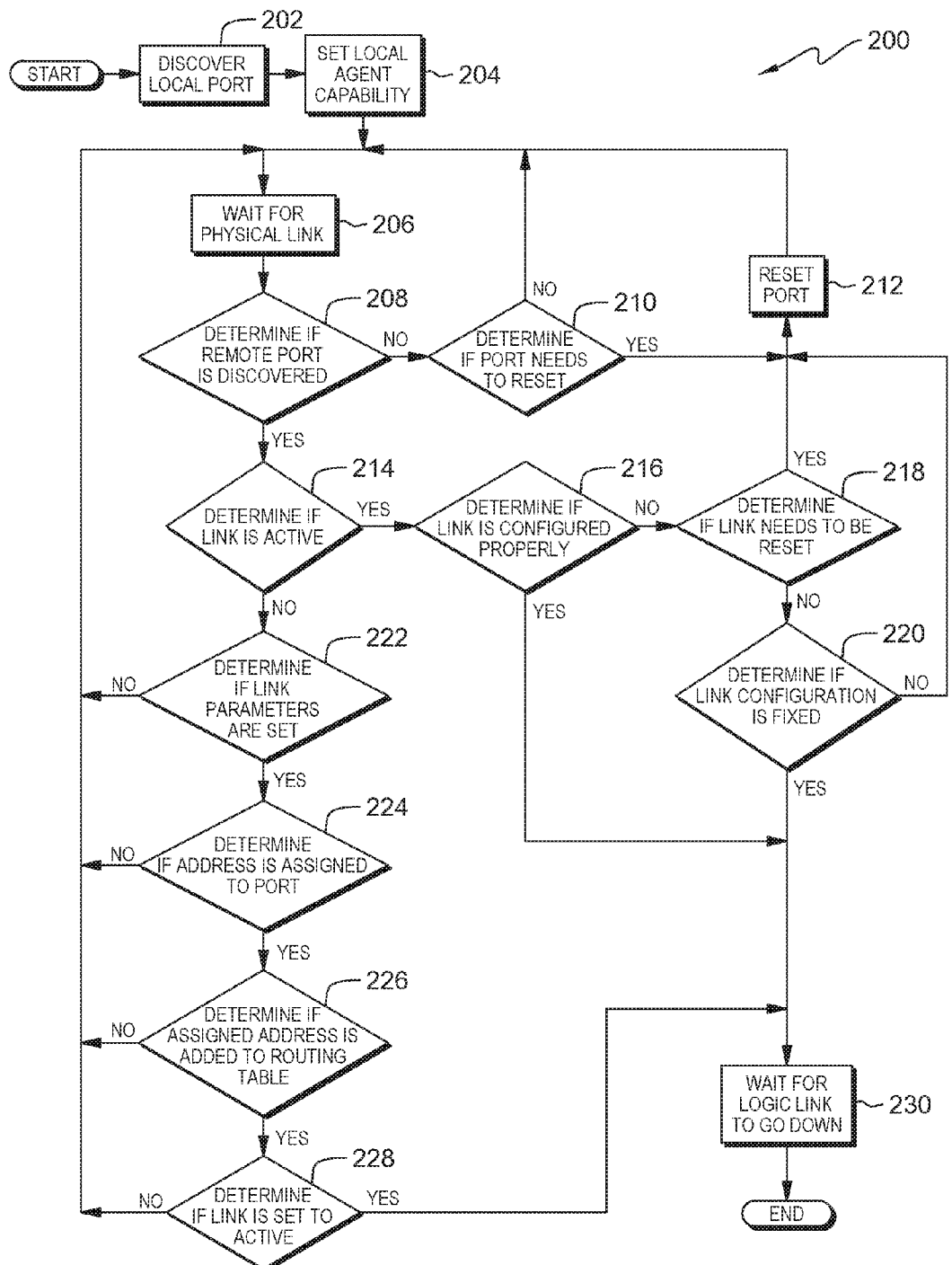
FIG. 2 depicts a flowchart depicting operational steps for a local agent distributed approach for managing a network, within the computing environment of FIG. 1, in accordance with one embodiment of the present invention.

FIG. 2 depicts a flowchart 200 of the steps, taken by local agent function 108 or local agent function 110 for a distributed approach for managing a network within computing environment 100 of FIG. 1, in accordance with an embodiment of the present invention. The Flowchart 200 depicts the management of network configuration of nodes (e.g. node 104 and node 106), specifically the network links which are local to nodes 104 and 106. Each instance of local agent function is bound to a single network node port, and configuring multiple network ports on node assumes the same flow for each port. Flowchart 200 is described with reference to local agent function 108 and node 104. Local agent function 110 would operate similarly with respect to node 106 within computing environment 100 and network 102.

In step 202, local agent function 108 discovers the local port. In one embodiment, the discovery of the local ports is done by listing available InfiniBand® devices within network 102 and querying of available ports via Get( ) method of the PortInfo( ) and NodeInfo( ) SMP attributes. In other embodiments, other query methods are used which are specific to the network environment which is deployed.

In step 204, local agent function 108 sets the capability mask of the discovered local port to reflect the fact the port has local agent functionality. The capability mask is a property of the port that can be discovered by other nodes during fabric discovery. Capability mask lists capabilities of the port. In one embodiment, free bits of the capability mask from SMP PortInfo attribute can be used. Setting the capability mask can be done using standard API or via vendor commands, specific to network adapters which are deployed.

In step 206, local agent function 108 waits for the physical link on the local port. The link can be immediately available, as seen during discovery step 202. In one embodiment, local agent function 108 waits for the link by utilizing periodic calls to Get( ) method of the PortInfo SMP attribute and examining the PortPhysicalState of returned data. In other embodiments, local agent function 108 waits for the physical link by waiting for an appropriate port event.

In decision 208, local agent function 108 determines if a remote port is discovered. The remote port is a port on switch 116 or switch 118. In one embodiment, the discovery is done via Get( )method of the PortInfo and NodeInfo SMP attributes. In other embodiments, other discovery methods are used which are specific to the network environment which is deployed. The discovery of the remote port can be successful or fail. The discovery of the remote port can fail because, for example, the remote component has gone down between steps 206 and decision 208 or because the remote component is malfunctioning. The failure to discover the remote port can be determined based upon a limited number of failed tries to perform the operation. If local agent function 108 discovers the remote port (YES branch, proceed to decision 214), local agent function 108 determines if the link is active. If local agent function 108 does not discover the remote port (NO branch, proceed to decision 210), local agent function 108 determines if the port needs to be reset.

In decision 210 local agent function 108 determines if the port needs to be reset. A port reset is needed, if the port logical state is active and the remote component does not answer (malfunction). Resetting the port allows the applications to see the local port failure in the presence of connected peer malfunction and allows these applications to perform error recovery. If the port does need to be reset (YES branch, proceed to step 212), local agent function 108 resets the port. If the port does not need to be reset (NO branch, proceed to step 206), local agent function 108 waits for the physical link.

In step 212, local agent function 108 resets the port. In one embodiment, local agent function 108 can reset the port via two Set( )methods of PortInfo SMP attribute. In the first Set( ) the physical property of the link is set to Disabled, while in the second Set( ) the physical property of the link is set to Polling. In other embodiments, other reset methods are used which are specific to the network environment which is deployed.

In decision 214, local agent function 108 determines if the link is active. The link can be active because cluster agent function 112 and cluster agent function 114 have configured the link before local agent function 108 was started on the port or because a previous running instance of local agent function 108 has configured the link. The state of the link is judged upon the query data of local and remote ports taken and saved by local agent function 108 in steps 206 and 208. If local agent function 108 determines that the logical link is active (YES branch, proceed to decision 216), local agent function 108 determines if link is configured properly. If local agent function 108 determines that the logical link is not active (NO branch, proceed to decision 222), local agent function 108 and determines whether link parameters have been set.

In decision 216, local agent function 108 determines if the link is configured properly. Local agent function 108 may determine that the link is configured property if the local and remote port parameters match. Certain port parameters must match for successful link operation (e.g., MTU, partitioning keys, the maximal link speed, enabled link speeds and widths, number of operational virtual lanes (VL), VL arbitration tables, service level (SL) to VL mappings, etc.). The proper link configuration is judged upon the query data of local and remote ports taken and saved in steps 206 and 208. The properties of the local and remote ports may differ because the hardware or firmware defaults of the two components may differ. If local agent function 108 determines that the link is configured properly (YES branch, proceed to step 230), local agent function 108 waits for link to go down. If local agent function 108 determines that the link is not configured properly (NO branch, proceed to decision 218), local agent function 108 determine if further link configuration requires link reset.

In decision 218, local agent function 108 determines if the link needs to be reset. The link configuration needs to be reset if certain mismatches (like differences in operational VL number or in SL to VL tables) are present. If local agent function 108 determines that the link needs to be reset (YES branch, proceed to step 212), local agent function 108 resets the port. If local agent function 108 determines that the link does not need to be reset (NO branch, proceed to decision 220), local agent function 108 determines if the link configuration is fixed.

In decision 220, local agent function 108 determines if the link configuration has been fixed. In one embodiment, local agent function 108 corrects link configuration by invoking Set( )methods of PortInfo, SLtoVLMappingTable, and VLArbitrationTable attributes. In other embodiments, local agent function 108 uses other configuration methods which are specific to the network environment which is deployed. The operation may succeed or fail. The operation may fail because the remote component has gone down or is malfunctioning. If local agent function 108 determines that the link configuration is fixed (YES branch, proceed to step 230), local agent function 108 waits for the link to go down. If local agent function 108 determines that the link configuration is not fixed (NO branch, proceed to step 212), local agent function 108 resets the port.

In decision 222, local agent function 108 determines if link parameters have been set. Certain aspects of the configuration must be the same on both sides of the link for proper operation of the link. In one embodiment, local agent function 108 sets the link parameters via Set( )methods of PortInfo, VLArbitrationTable, P_KeyTable and SLtoVL-MappingTable SMP attributes. In other embodiments, other configuration methods are used which are specific to the network environment which is deployed. Both sides of the link may require configuration, and the configuration may succeed or fail. The operation may fail because the remote component has gone down or is malfunctioning or because local port is malfunctioning. If local agent function 108 determines that the port parameters are set (YES branch, proceed to decision 224), local agent function 108 determines if local address is assigned to the port. If local agent function 108 determines that the port parameters are not set (NO branch, proceed to step 206) local agent function 108 waits for the physical link.

In decision 224, local agent function 108 determines if an address is assigned to the port. In one embodiment, the local addresses may include one or more local identifier (LID) addresses, set via Set( )method of the SMP PortInfo attribute. In other embodiments, local agent function 108 uses other configuration methods which are specific to the network environment which is deployed. Failure of the operation may mean a malfunction of a local port. In order for multiple local agent to coexist and not cause address assignment conflict, the same predefined address assignment scheme shall be used by each local agent function. In one embodiment, the same scheme is used by local agent function instances and is a function of switch identification and switch port number connected to the port that local agent function 108 and local agent function 114 are bound to. The scheme can be as simple as expression LID(switch_no, port_no)=switch_no*OFFSET+port_no. In another embodiment, a server is queried to assign the address. If local agent function 108 determines that the address is assigned to the port (YES branch, proceed to decision 226), local agent function 108 determines if adding assigned address to routing table is successful. If local agent function 108 determines that the address is not assigned to the port (NO branch, proceed to step 206), local agent function 108 waits for the physical link.

In decision 226, local agent function 108 determines if the assigned address is added to the routing table. The routing tables can signify unicast and multicast routing. In one embodiment, the format of unicast table is LFT and the format of multicast table is MFT. LFTs specify LID to port routing, while MFTs specify joining of switch ports to multicast addresses. In other embodiments, local agent function 108 uses other configuration methods which are specific to the network environment which is deployed. Multicast tables may need to be modified, if the local agent configuration specifies that the port needs to be joined to predefined multicast groups. Adding the ports to predefined multicast groups allows critical applications (e.g., IP over IB, Ethernet over IB) to start working without full fabric discovery taking place and without master SM with SA functionality running. Modifying routing tables may require read-modify-write cycles, if routing table modifications are done by blocks. In one embodiment, modifying routing tables is done via Set( )methods of LinearForwardingTable and MulticastForwardingTable SMP attributes. In another embodiment, routing tables are modified using SNMP protocol. In yet another embodiment, vendor API is used to set routing tables on either switch 116 or switch 118. Modifying routing tables may fail if remote component has gone down or is malfunctioning. If local agent function 108 determines that assigned addresses have been added to the routing table (YES branch, proceed to decision 228), local agent function 108 determines if link is set to active. If local agent function 108 determines that the assigned address has not been added to the routing table (No branch, proceed to step 206), local agent function 108 waits for the physical link.

In decision 228, local agent function 108 determines if setting link to active logical state is successful. Both sides of the link need to be set to active state. In one embodiment, local agent function 108 invokes Set( )methods of SMP PortInfo attribute on local and remote ports, manipulating the logical state of the link (setting state to Armed and then to Active). In other embodiments, local agent function 108 uses other configuration methods which are specific to the network environment which is deployed. The operation may fail because the remote component has gone down or is malfunctioning or because local port is malfunctioning. If local agent function 108 determines that setting logical state of the link to active state is successful (YES branch, proceed to step 230), local agent function 108 waits for the logical link to go down. If local agent function 108 determines that the link is not set to active (NO branch, proceed to step 206), local agent function 108 waits for the physical link.

In step 230, the local agent function 108 completes local link configuration. The link configuration will be restarted if link goes down. In step 230, local agent function 108 wait for the logical link to go down. In one embodiment, waiting for the logical to go down is done by periodic calls to Get( )method of the PortInfo SMP attribute and comparing the PortState of the result with value Active. In other embodiments, waiting for the logical link to go down is done by waiting for appropriate port event. Upon completion of the state, the local agent function returns to step 206.

Figure 3:
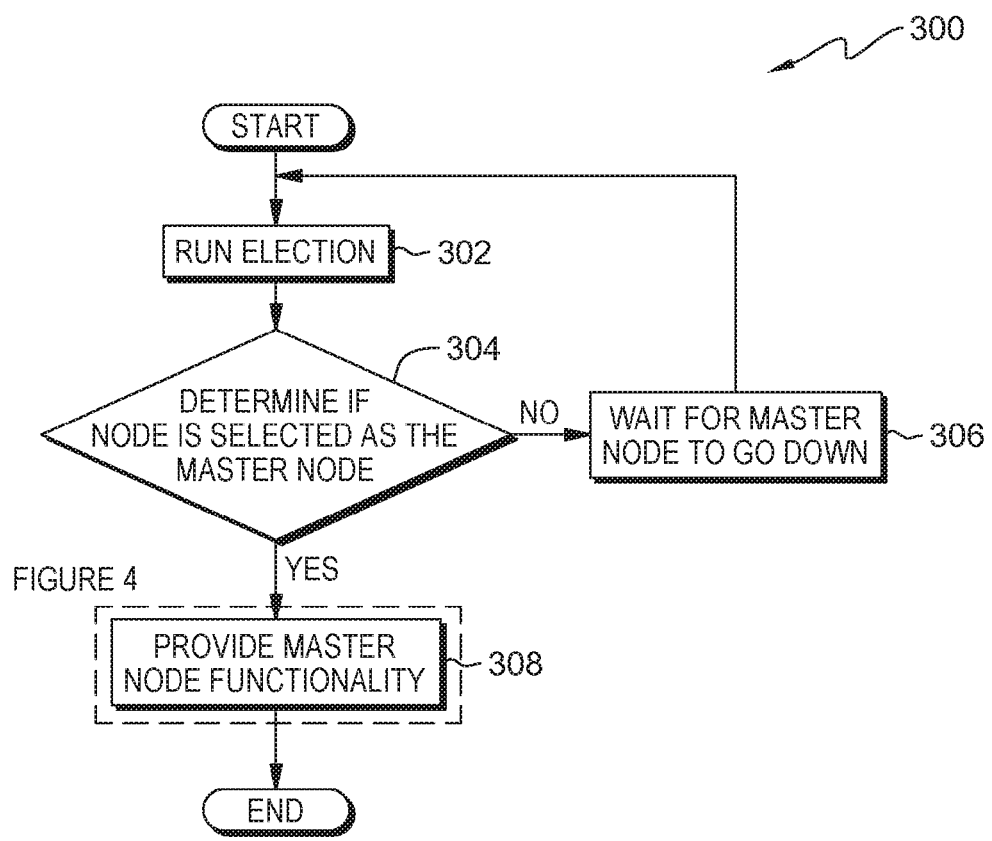
FIG. 3 depicts a flowchart depicting operational steps for a cluster agent distributed approach for managing a network, within the computing environment of FIG. 1, in accordance with one embodiment of the present invention.

FIG. 3 depicts a flowchart 300 of the steps taken by cluster agent function 112 or cluster agent function 114 for a distributed approach for managing a network 102, within the computing environment of FIG. 1, in accordance with one embodiment of the present invention. Flowchart 300 is described with reference to cluster agent function 112 and node 104. Cluster agent function 114 would operate similarly with respect to node 106 within computing environment 100 and network 102.

In step 302, cluster agent function 112 runs the election to select a single MASTER cluster agent instance in the fabric.

In one embodiment, one instance of cluster agent function 112 assumes a MASTER role and makes network configuration changes. Other cluster agent instances assume a STANDBY role and will wait for the MASTER instance to crash, shut down, or otherwise become inactive as the MASTER, at which point cluster agent function 112 restarts restart the election. In yet another embodiment, one of the existing solutions for electing a singleton service in a cluster can be used. All methods involve discovery of present instances and exchanging network messages to negotiate election, promotion, and stepping down.

In decision 304, cluster agent function 112 determines if the running instance has been elected to be the MASTER. Cluster agent function 112 checks for MASTER status in accordance with the election protocol deployed in step 302. If cluster agent function 112 determines that the node has been elected as the master node (YES branch, proceed to step 308), cluster agent function 112 provides master node functionality. If cluster agent function 112 determines that the node is not elected as the master node (No branch, proceed to step 306), cluster agent function 112 wait for the master instance to go down.

In step 306, cluster agent function 112 waits for the master instance to go down. Cluster agent function 112 waits for the master instance to go down in accordance with election protocol used in step 302. In one embodiment, a standby instance polls master for health status. In another embodiment, the master instance informs standby instances of the master instance's presence. In yet another embodiment, a health monitoring application informs standby instances about master failure. In yet another embodiment, cluster agent function 112 can use a combination of metrics can be used to monitor the instances about master failure. Once a standby instance has detected the master instance disappearance, cluster agent function 112 returns to step 302 (Run Election).

In step 308, cluster agent function 112 provides the master node functionality. Only cluster agents in master role make changes in network configuration. This step is explained in greater detail on FIG. 4.

Figure 4:
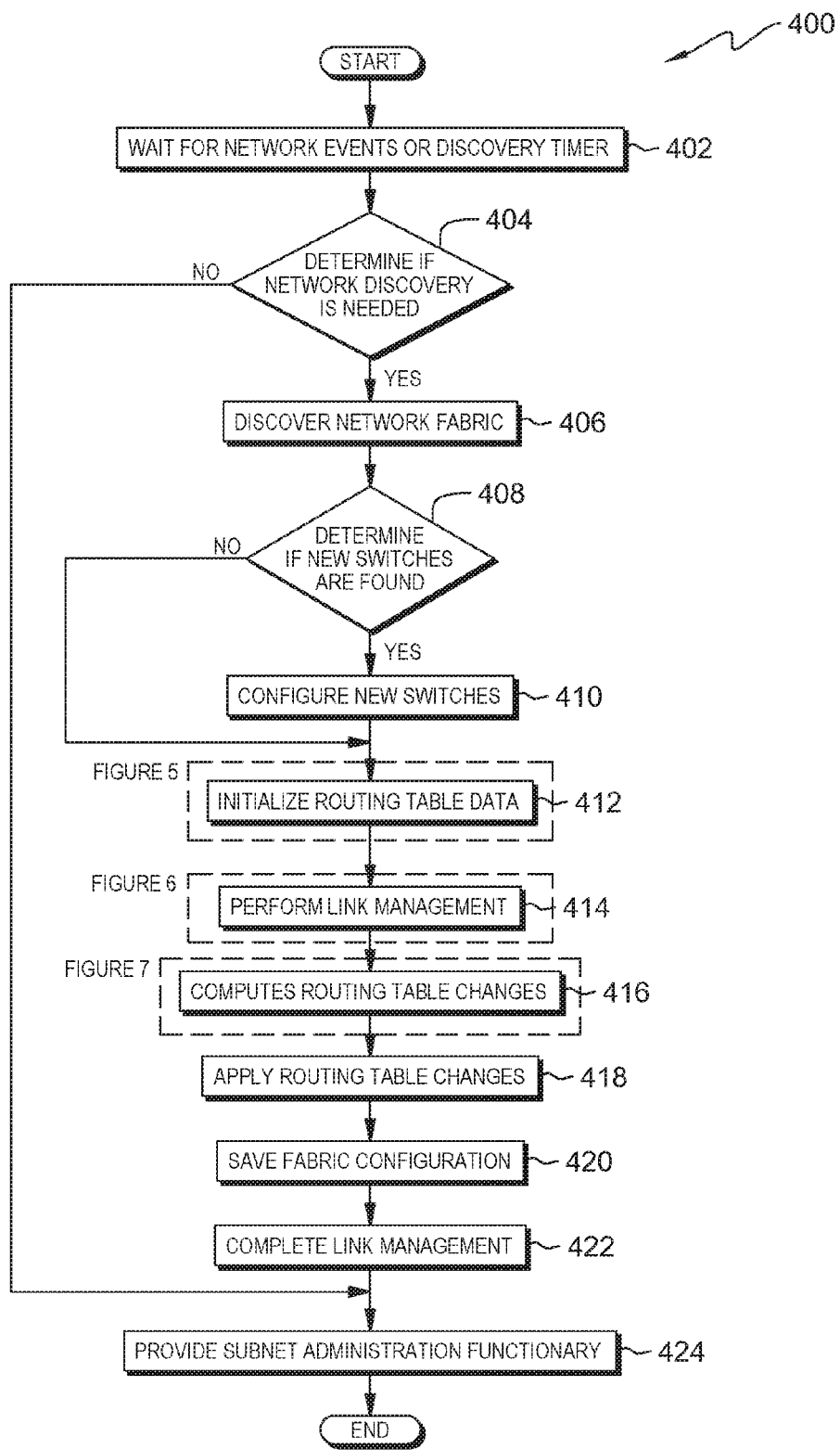
FIG. 4 depicts a flowchart depicting operational steps that the cluster agent takes in a master role for managing a network, within the computing environment of FIG. 1, in accordance with one embodiment of the present invention.

FIG. 4 depicts a flowchart 400 of the steps taken by cluster agent function 112 or cluster agent function 114 in a master role for managing a network 102 within computing environment 100 of FIG. 1, in accordance with an embodiment of the present invention. Flowchart 400 depicts the management of nodes within the network. Flowchart 400 is described with reference to cluster agent function 112 and node 104. Cluster agent function 114 would operate similarly with respect to node 106 within computing environment 100 and network 102.

In step 402, cluster agent function 112 waits for network event or discovery timer. The master instance of cluster agent function 112 performs periodic discoveries of the network fabric. Cluster agent function 112 can also trigger discoveries by a network event (e.g., switch port going up or down). Discoveries are needed in order to detect changes in the fabric. Cluster agent function 112 can use timers for periodic discoveries. In one embodiment, cluster agent function 112 discovers network events by receiving appropriate Trap( ) messages from switches 116 and 118. In another embodiment, new nodes can send messages to signal joining the fabric and health monitoring application can send messages about nodes leaving the fabric. In other embodiments, methods specific to the deployed networking environment are used to send and receive events.

In decision 404, cluster agent function 112 determines if network discovery is needed. Cluster agent function 112 may determine that network discovery is needed if network event signals a port up or port down, or if a periodic timer for network discovery has fired. Some network events are traps which do not signal a fabric change or are requests for SA functionality (like querying the database tables or joining or leaving multicast groups). Such events do not cause network discovery. If cluster agent function 112 determines that network discovery is needed (YES branch, proceed to 406), cluster agent function 112 discovers the network fabric. If cluster agent function 112 determines that network discovery is not needed (NO branch, proceed to step 424), cluster agent function 112 provide SA functionality.

In step 406, cluster agent function 112 discovers network fabric. Cluster agent function 112 can use multiple local ports to speed up the discovery. At first discovery iteration, cluster agent function 112 discovers components attached to local ports. If the attached component is not a switch, discovery does not proceed further. If attached component is switch, cluster agent function 112 discovers components attached to switch ports during a second iteration. Discovery proceeds over all local ports, but if the same switch is found using more than one local port, cluster agent function 112 uses one local port (presumably with shortest path to the switch) for switch discovery. During a next iteration, cluster agent function 112 discovers new switches found during the previous iteration. If the multiple paths lead to the same switch, cluster agent function 112 uses a shortest path to discover switch 116 or switch 118. Cluster agent function 112 repeats the discovery procedures until no new switches are found, at which point discovery of the fabric completes. In one embodiment, cluster agent function 112 performs discovery using direct InfiniBand® routing and involves sending Get( ) methods of SMP attributes PortInfo, NodeInfo, SwitchInfo. In another embodiment, vendor specific API is used to query switch 116 or switch 118 topology. In yet another embodiment SNMP protocol can be used to do the discovery. In other embodiments, methods specific to networking environments are used to do the discovery.

In decision 408, cluster agent function 112 determines if new switches are found. For the initial discovery, all found switches are new. For subsequent discoveries, the switches not previously seen are considered new. In one embodiment, new switches are identified by globally unique identifier (hereinafter GUID). In another embodiment, a node name can be used to identify a switch. In yet another embodiment, a combination of vendor identification, product identification, GUID, and node name can be used. If cluster agent function 112 finds new switches (YES branch, proceed to step 410), cluster agent function 112 configures the new switches. If cluster agent function 112 does not find new switches (No branch, proceed to step 412), cluster agent function 112 initializes routing tables data.

In step 410, cluster agent function 112 configures the new switches. Configuration of new switches may involve assigning switch 116 or switch 118 one or more network addresses, assigning a node name, joining switch 116 or switch 118 to one or more predefined multicast groups, assigning limits to the size of routing tables, assigning defaults for port timeouts, MTU, speed, width, VL arbitration tables, SL to VL mapping tables etc. In one embodiment, initial switch configuration is done via Set( )methods of SMP attributes PortInfo, NodeDescription, SwitchInfo, SLtoVLMappingTable, and VLArbitrationTable. In another embodiment, cluster agent function 112 uses SNMP protocol to set initial switch configuration. In yet another embodiment, cluster agent function 112 uses vendor API to configure switch 116 or switch 118.

In step 412, cluster agent function 112 initializes routing table data. Routing table data includes a global table of addresses which are not valid for all switches, and per-switch tables of added and removed addresses. This step is explained in greater detail in FIG. 5.

In step 414, cluster agent function 112 performs link management. This step is explained in greater detail in FIG. 6.

In step 416, cluster agent function 112 computes routing table changes. Cluster agent function 112 computes the changes by invoking a function for each port of each switch. The computation function flow is described in FIG. 7. As it had been said before, there is a global table of invalid addresses, and per-switch table of added and removed addresses. The computation function manipulates these tables. Two types of tables can be used. The unicast routing tables specify which addresses are not reachable and specify the switch route port for reachable addresses. The multicast routing tables specify which multicast addresses are not reachable and specify the list of ports which are joined for reachable multicast addresses. In one embodiment, Infini-Band® LFT and MFT routing tables which specify LID and multicast local identifier (MLID) addresses can be used. In other embodiments, the format of the tables and the meaning of unicast and multicast addresses is dependent on the type of networking environment which is used.

Once the computation function is run on each port of discovered switch, the routing tables for each switch are finalized. Removed (invalid) addresses for each switch (switch 116 and 118) are computed as a union of removed addresses of this switch and global invalid table. For each switch (switch 116 and switch 118), cross-switch routes to all end-points connected to other switches are added, provided other switches have connectivity to this switch. The routing destination for cross-switch routing is the local switch port which provides connection to the other switch. If there are multiple links to the other switch, multiple ports can be used to route to different addresses in a round-robin fashion. If multiple inter-switch connections which have different number of hops are present, ports which connect via the shortest number of hops can be used as the routing destination.

In step 418, cluster agent function 112 applies routing table changes. In one embodiment, Set( )methods of SMP attributes LINEARFORWTBL and MULTICASTFORWTBL are used to set the routing tables. In another embodiment, SNMP protocol is used to configure the routing tables. In yet another embodiment, vendor specific API is used to configure the routing tables. In some embodiments, modifying the routing tables is done in read-modify-write cycles.

In step 420, cluster agent function 112 saves fabric configuration. The fabric configuration includes the list of switches, each switch including the list components, connected to each switch port, along with address information of each component and the component state.

In step 422, cluster agent function 112 completes link management. In some embodiments, certain aspects of link management (e.g., powering off ports, phasing out components, resetting links) cannot be completed until other configuration steps are done, because cluster agent function 112 cut existing connections to managed components or because other managed components are not available. In some embodiments, moving links without a local agent function 108 or local agent function 110 to an ACTIVE state can be done only after updates to routing tables have been applied. These aspects of link management are delayed until all other configurations are completed.

In step 424, cluster agent function 112 provides SA functionality. If there are pending SA requests cluster agent function 112 and cluster agent function 114 are handled by cluster agent function 112. In one embodiment, such events can be query requests to internal databases, like query of nodes, ports, paths, service or multicast registrations, GUID identifiers, etc., based on some selection criteria. In another embodiment, SA requests can include requests to join or leave multicast addresses. Multicast registrations can use existing standards or be enhanced with methods described in disclosure "Optimizing multicast management in InfiniBand® Networks".

Figure 5:
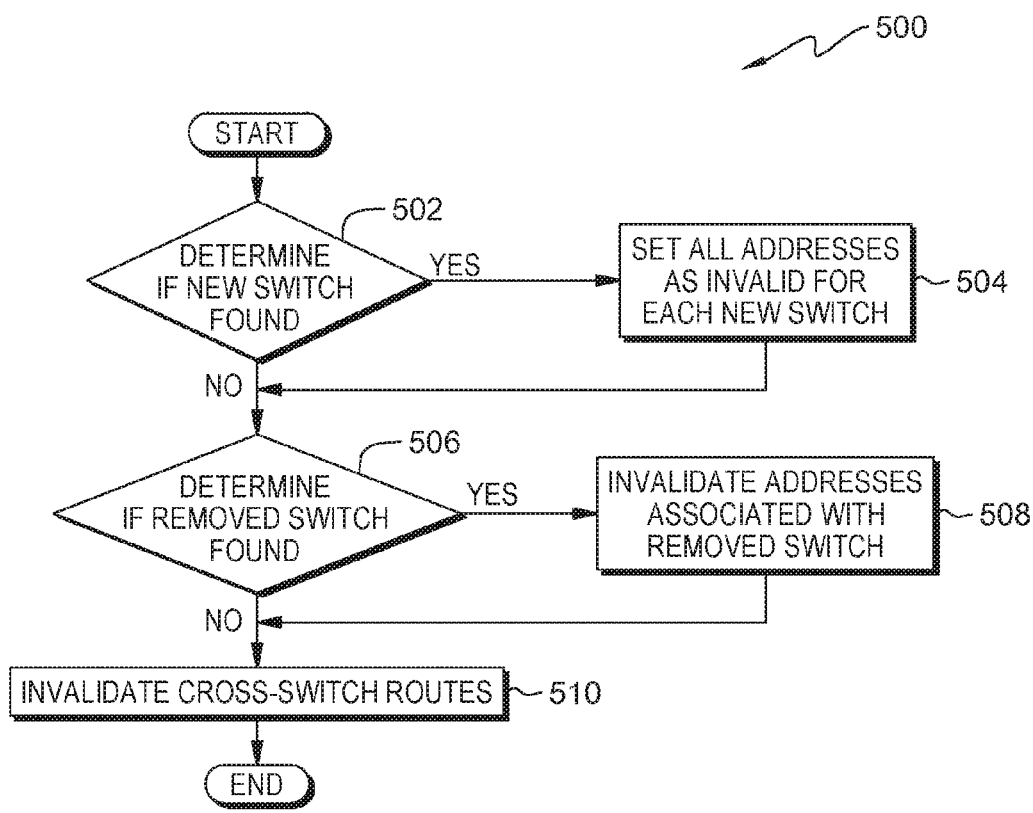
FIG. 5 depicts a flowchart depicting operational steps for the cluster agent function in a master role taken to initialize the routing table data after fabric discovery, within the computing environment of FIG. 1, in accordance with one embodiment of the present invention.

FIG. 5 depicts a flowchart 500 of the steps taken by cluster agent function 112 or cluster agent function 114 in a master role to initialize the routing table data following a network discovery (step 412 of FIG. 4), in accordance with an embodiment of the present invention. Flowchart 500 is described with reference to cluster agent function 112 and node 104. Cluster agent function 114 would operate similarly with respect to node 106 within computing environment 100 and network 102.

Routing table data include a global table of addresses which are not valid for all switches, and per-switch tables of added and removed addresses. Two types of tables can be used. The unicast routing tables specify which addresses are not reachable and specify the switch route port for reachable addresses. The multicast routing tables specify which multicast addresses are not reachable and specify the list of ports which are joined for reachable multicast addresses. In one embodiment, InfiniBand® LFT and MFT routing tables which specify LID and MLID addresses can be used. In other embodiments, the format of the tables and the meaning of unicast and multicast addresses is dependent on the type of networking environment which is used.

In decision 502, cluster agent function 112 determines if a new switch is found. For the initial discovery, all found switches are new. For subsequent discoveries, the switches not previously seen are considered new. In one embodiment, new switches are identified by GUID number. In another embodiment, a node name can be used to identify a switch. In yet another embodiment, a combination of vendor identification, product identification, GUID, and node name can be used. If cluster agent function 112 finds a new switch (YES branch, proceed to step 504), cluster agent function 112 sets all addresses as invalid for each new switch. If cluster agent function 112 does not find a new switch (No branch, proceed to decision 506), cluster agent function 112 determines if a removed switch is found.

In step 504, cluster agent function 112 sets addresses as invalid for each new switch. The format of addresses and the routing tables is specific to an embodiment uses, as described above.

In decision 506, cluster agent function 112 determines if a removed switch is found. For initial discovery, no switch will be removed. For subsequent discoveries, a switch is removed if the switch was seen during the previous discovery but it not seen now. In one embodiment, a switch is identified by GUID number. In another embodiment, a node name can be used to identify a switch. In yet another embodiment, a combination of vendor identification, product identification, GUID, and node name can be used. If cluster agent function 112 finds the removed switch (YES branch, proceed to step 508), cluster agent function 112 invalidates addresses associated with the removed switch. If cluster agent function 112 does not find the removed switch (NO branch, proceed to step 510), cluster agent function 112 invalidates cross-switch routes.

In step 508, cluster agent function 112 invalidates addresses previously associated with the removed switch. Cluster agent function 112 adds the addresses to a global table of invalid addresses. The format of addresses and the routing tables is specific to an embodiment, as described above.

In step 510, cluster agent function 112 invalidates cross-switch routes. For each switch, cluster agent function 112 or cluster agent function 113 marks addresses previously associated with other switches as invalid. The format of addresses and the routing tables is specific to an embodiment, as described above.

Figure 6:
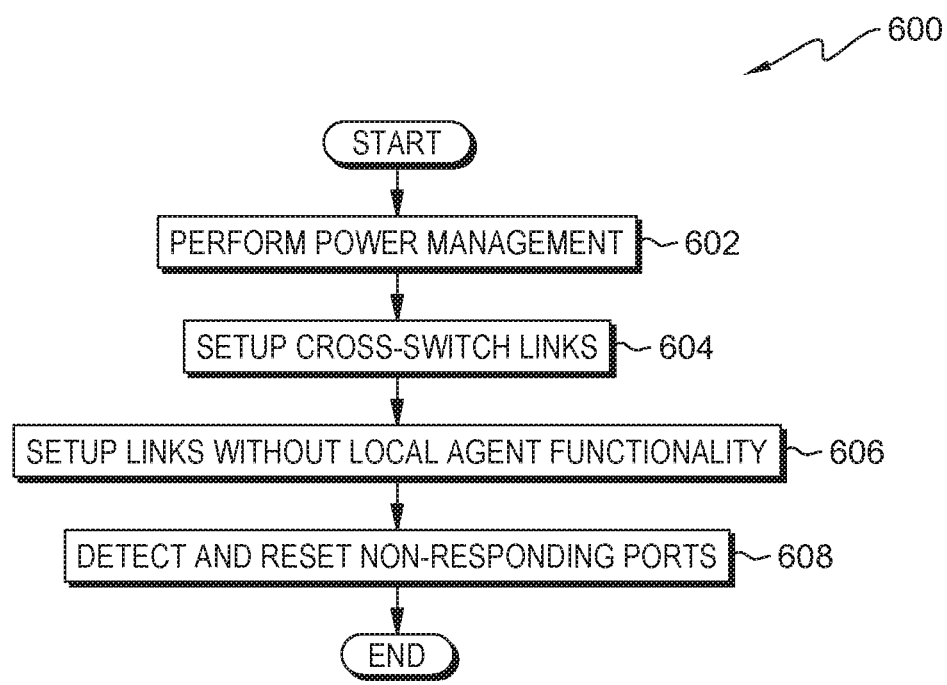
FIG. 6 depicts a flowchart depicting operational steps for the cluster agent function in a master role taken to perform link management after fabric discovery, within the computing environment of FIG. 1, in accordance with one embodiment of the present invention.

FIG. 6 depicts a flowchart 600 of the steps taken by cluster agent function 112 or cluster agent function 114 in master role to implement link management following the network discovery (step 414 of FIG. 4), in accordance with an embodiment of the present invention. Flowchart 600 is described with reference to cluster agent function 112 and node 104. Cluster agent function 114 would operate similarly with respect to node 106 within computing environment 100 and network 102.

In step 602, cluster agent function 112 performs power management. The master instance of the cluster agent function may implement a configuration option of which ports are expected to be used and which ports are not. Expected ports that are turned off can be enabled. In one embodiment, this is done using Set( )method of the SMP PortInfo attribute (manipulating physical property of the link to disabled or enabled). In another embodiment, SNMP protocol can be used to enable or disable ports. In yet another embodiment, vendor API is used to enable or disable the ports.

In step 604, cluster agent function 112 sets up cross-switch links. All cross-switch links are expected to be in ACTIVE state to allow cross-switch routing. If some cross-switch links are present in non-ACTIVE state, they are switched to ACTIVE state. In addition, various parameters of the link needs to match (MTU, link speed, link width, VL arbitration and SL2VL tables). In one embodiment, cluster agent function 112 matches link parameters by using Set( ) methods of the relevant SMP attributes (e.g., PortInfo, SLtoVLMappingTable, and VLArbitrationTable), and changes the link to active state by using Set( )method of the SMP PortInfo attribute (changing logical state of the link to active). In another embodiment, SNMP protocol can be used to manipulate the state and configuration. In yet another embodiment, vendor API is used to manipulate the state and configuration.

In step 606, cluster agent function 112 sets up links without local agent functionality. If a component connected to the switch port does not implement local agent functionality, it is responsibility of cluster agent function 112 to configure the link. In one embodiment, the presence of a local agent is judged by set bits in capability mask field of the data, returned with the Get( )method of the PortInfo attribute during discovery. In other embodiments, methods specific to the networking environment are used to detect the presence of a local agent during discovery. Setting up the link may require operations on both end-points of the link. Setting up link parameters to match each other (MTU, link speed, link width, VL arbitration and SL2VL tables) is required. Setting up links may incur assignment of one or more network unicast and multicast addresses. In one embodiment, these are LID and MLID addresses. In other embodiments, the meaning of address and its format depend on the network environment that is deployed. In one embodiment, Set( )methods of the relevant SMP attributes (PortInfo, SLtoVLMappingTable, and VLArbitrationTable) are used to match the link parameters and assign addresses. In another embodiment, SNMP protocol can be used to manipulate the state. In yet another embodiment, vendor API is used to manipulate the state. For the purpose of further routing table computations, these links are considered as discovered and present. In one embodiment, the links are moved to ACTIVE state before new routing tables are applied. In another embodiment, moving the links to ACTIVE state is delayed until new routing tables have been applied.

In step 608, cluster agent function 112 detects and resets non-responding ports. Non-responding ports are defined as end-points connected to a switch which have physical link present, but have a malfunction and do not respond to network queries. This situation, having a malfunctioning link that is active from physical perspective, may cause disruptions in the network. Resetting such ports is beneficial to applications since it allows application connections to be reset (e.g., by getting a positive indication a link has gone down). Resetting such ports is also beneficial to switch firmware because it allows internal buffers to be flushed and credits released. A port can be considered non-responding if the port fails to discover continuously a predetermined number of times. Resetting of the link is done by resetting the port on the switch side. In one embodiment, a port is reset by two Set( )methods of PortInfo SMP attribute (setting physical property of the link to disabled and then to enabled). In another embodiment, SNMP protocol is used to reset the switch port. In yet another embodiment, a vendor API is used to reset the port.

Figure 7:
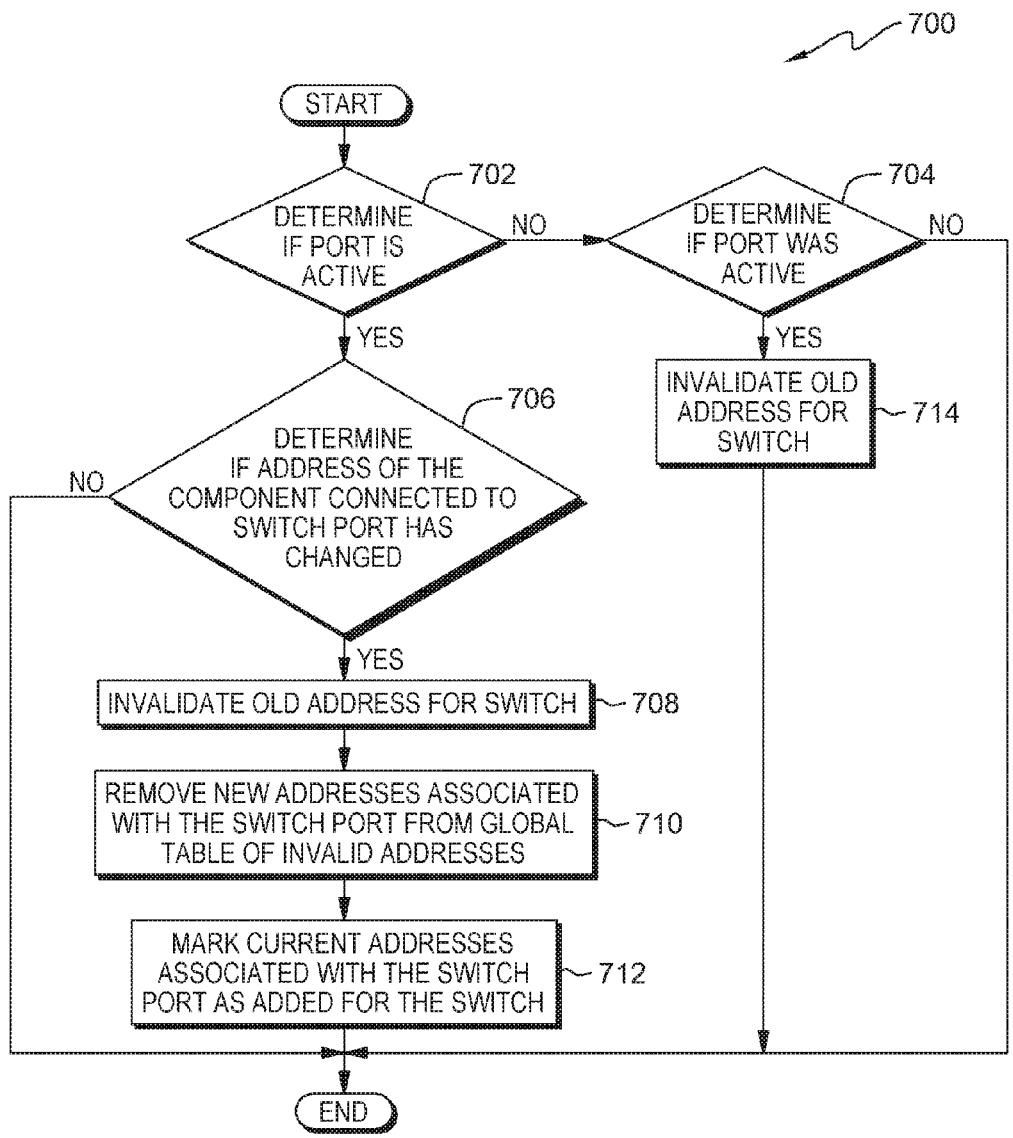
FIG. 7 depicts a flowchart depicting operational steps for the cluster agent function in a master role, taken to compute changes to routing table after network discovery, within the computing environment of FIG. 1, in accordance with one embodiment of the present invention.

FIG. 7 depicts a flowchart 700 of the steps taken by cluster agent function 112 or cluster agent function 114 in a master role to implement routing table computation function that is invoked after network discovery (step 416 of FIG. 4), in accordance with an embodiment of the present invention. Flowchart 700 depicts the flow taken for each discovered port of each discovered switch. Flowchart 700 is described with reference to cluster agent function 112 and node 104. Cluster agent function 114 would operate similarly with respect to node 106 within computing environment 100 and network 102.

In decision 702, cluster agent function 112 determines if port is active. Cluster agent function 112 determines if the port is active based on the discovery data for the link, associated with the port. In one embodiment, the logical state of the data returned with Get( ) method of the PortInfo attribute during discovery is checked. In other embodiments, other relevant data saved during discovery is checked. If cluster agent function 112 determines that the port is active (YES branch, proceed to decision 706), cluster agent function 112 determines if address of the component connected to switch port has changed. If cluster agent function 112 determines that the port is not active (No branch, proceed to decision 704), cluster agent function 112 determines if the port was active.

In decision 704, cluster agent function 112 determines if the port was active. Cluster agent function 112 checks the previous state of the port against the saved state of the fabric during the previous network discovery. If cluster agent function 112 determines that the port was active (YES branch, proceed to step 714), cluster agent function 112 invalidates the old address associated with this switch port for this switch. If cluster agent function 112 determines that the port was not active (No branch, proceed to END), and cluster agent function 112 completes the operation.

In decision 706, cluster agent function 112 determine if address of the component connected to switch port has changed. The previous address of the connected component is checked against the saved state of the network fabric during the previous network discovery. In one embodiment the address is LID. If cluster agent function 112 determines that the address has changed (YES branch, proceed to step 708), cluster agent function 112 invalidates old addresses associated with the switch port for switch 116 or switch 118. If the has not changed (No branch, proceed to END), and cluster agent function 112 ends the operation.

In step 708, cluster agent function 112 invalidates old addresses associated with the switch port for switch 116 or switch 118. In one embodiment, only a unicast address is invalidated. In other embodiments, multicast addresses can be invalidated if the port was joined to multicast groups.

In step 710, cluster agent function 112 removes new addresses associated with the switch port from global table of invalid addresses. In one embodiment, only unicast address is removed. In other embodiments, multicast addresses can be removed if predefined multicast groups are used.

In step 712, cluster agent function 112 marks current addresses associated with the switch port, as added, for switch 116 or switch 118. In one embodiment, only unicast address is added. In other embodiments, multicast addresses can be added if predefined multicast groups are used.

In step 714, cluster agent function 112 invalidates old addresses associated with the switch port for this switch. In one embodiment, only unicast address is invalidated. In other embodiments, multicast addresses can be invalidated, if the port was joined to multicast groups. This step is substantially similar to step 708.

Figure 8:
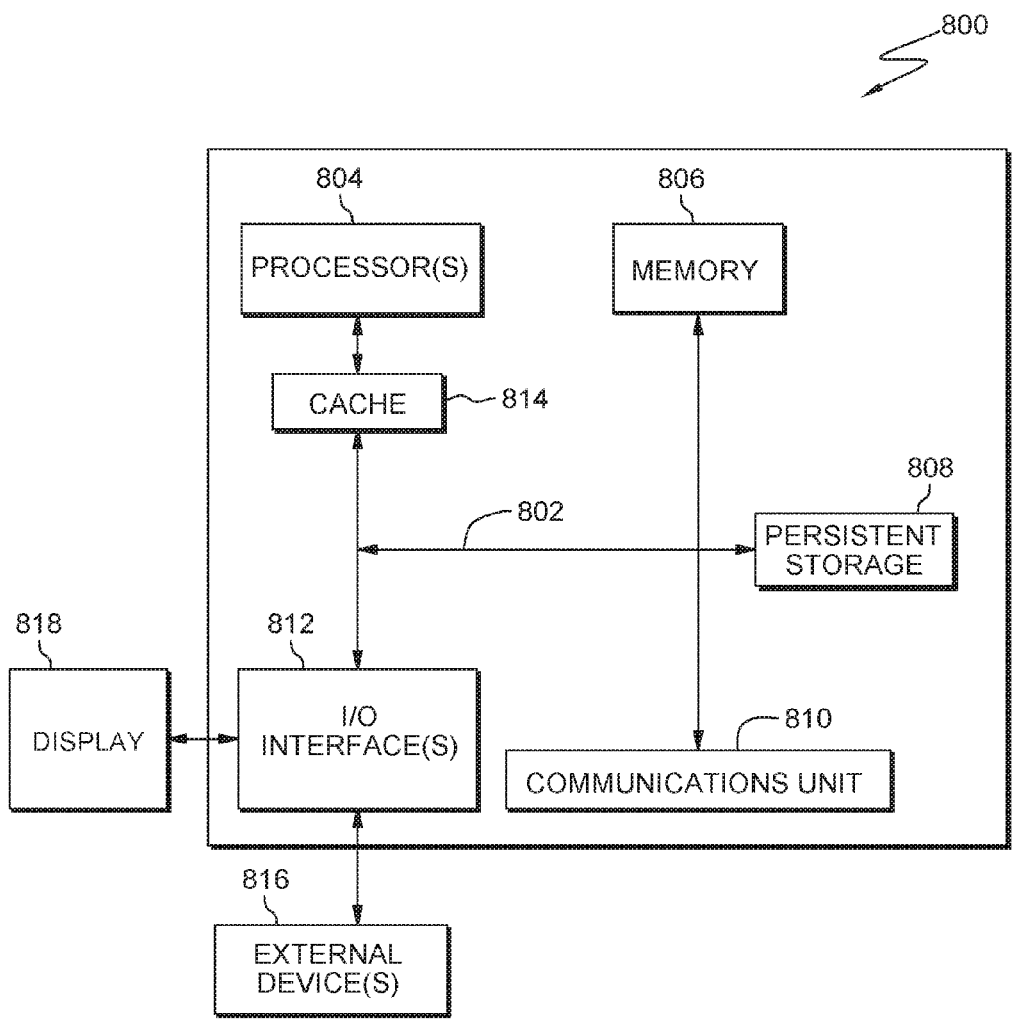
FIG. 8 depicts a block diagram depicting the internal and external components of nodes, switches, and the network of FIG. 1, in accordance with one embodiment of the present invention.

FIG. 8 depicts a block diagram 800 of components of node 104, node 106, switch 116, and switch 118, in accordance with an illustrative embodiment of the present invention. It should be appreciated that FIG. 8 provides an illustration of one implementation and does not imply any limitations with regard to the environments in which different embodiments may be implemented. Many modifications to the depicted environment may be made.

Node 104, node 106, switch 116, and switch 118 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any additional hardware components within a system. For example, communications fabric 802 can be implemented with one or more buses.

Memory 806 and persistent storage 808 are computer-readable storage media. In one embodiment, memory 806 includes random access memory (RAM) and cache memory 814. In general, memory 806 can include any suitable volatile or non-volatile computer-readable storage media.

Memory 806 is stored for execution by one or more of the respective computer processors 804 of node 104, node 106, switch 116, and switch 118 via one or more memories of memory 806 of node 104, node 106, switch 116, and switch 118. In the depicted embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in the examples, provides for communications with other data processing systems or devices, including node 104, node 106, switch 116, and switch 118. In the examples, communications unit 810 includes one or more network interface cards. Communications unit 810 may provide communications through the use of either or both physical and wireless communications links.

I/O interface(s) 812 allows for input and output of data with other devices that may be connected to node 104, node 106, switch 116, and switch 118. For example, I/O interface 812 may provide a connection to external devices 816 such as a keyboard, keypad, camera, a touch screen, and/or some other suitable input device. External devices 816 can also include portable computer-readable storage media such as, for example, thumb drives, portable optical or magnetic disks, and memory cards. Software and data used to practice embodiments of the present invention, e.g., local agent function 108, local agent function 110, cluster agent function 112, and cluster agent function 114 can be stored on such portable computer-readable storage media and can be loaded onto persistent storage 808 of node 104, node 106, switch 116, and switch 118 via I/O interface(s) 812 of node 104, node 106, switch 116, and switch 118. Software and data used to practice embodiments of the present invention, e.g., local agent function 108, local agent function 110, cluster agent function 112, and cluster agent function 114 can be stored on such portable computer-readable storage media and can be loaded onto persistent storage 808 of node 104, node 106, switch 116, and switch 118 via I/O interface(s) 812 of node 104, node 106, switch 116, and switch 118. I/O interface(s) 812 also connect to a display 818.

Display 818 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In other embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for distributed management of a network, the method comprising:
    discovering, by one or more processors, a network, wherein the network is comprised of a plurality of nodes and at least one switch;
    identifying, by one or more processors, a first port associated with the at least one node;
    identifying, by one or more processors, a link between the first port and a second port within the network;
    determining, by one or more processors, the at least one link is properly configured;
    selecting, by one or more processors, a first node of the plurality of nodes, wherein the first node provides subnet administrator functionality;
    determining, by one or more processors, that the first node is not a master node, wherein the master node is configured to manage the network;
    identifying, by one or more processors, a second node that is the master node;
    determining, by one or more processors, that the second node has entered a standby mode;
    selecting, by one or more processors, the first node to be the master node;
    initializing, by one or more processors, a routing table, wherein the routing table contains locations of each node of the plurality of nodes and a location of the at least one switch;
    identifying, by one or more processors, a change to the network;

identifying, by one or more processors, that a third node within the network is malfunctioning;

establishing, by one or more processors, a routing path, wherein the routing path is a cross node routing path;

identifying, by one or more processors, that a fourth node is non-responding;

resetting, by one or more processors, a port associated with the fourth node;

assigning, by one or more processors, a network address to each node incorporated into the network;

invalidating, by one or more processors, network addresses associated with each node removed from the network;

determining, by one or more processors, that an address associated with at least one port has changed;

invalidating, by one or more processors, the address associated with the at least one port;

identifying, by one or more processors, an updated address associated with the at least one port; and adjusting, by one or more processors, the routing table to include the updated address associated with the at least one port, based on the change to the network.

\* \* \* \* \*